(12) United States Patent
Okugawa et al.

(10) Patent No.: US 7,111,455 B2
(45) Date of Patent: Sep. 26, 2006

(54) EXHAUST CLEANING DEVICE OF INTERNAL COMBUSTION ENGINE

(75) Inventors: Shinichiro Okugawa, Toyota (JP); Kazuo Kojima, Nagoya (JP)

(73) Assignee: Denso Corporation, Kariya (JP)

( * ) Notice: Subject to any disclaimer, the term of this patent is extended or adjusted under 35 U.S.C. 154(b) by 5 days.

(21) Appl. No.: 11/111,791

(22) Filed: Apr. 22, 2005

(65) Prior Publication Data

US 2005/0241301 A1    Nov. 3, 2005

(30) Foreign Application Priority Data

Apr. 30, 2004    (JP)    ............... 2004-135249

(51) Int. Cl.
*F01N 3/00*    (2006.01)
(52) U.S. Cl. .............. 60/295; 60/285; 60/291; 60/297
(58) Field of Classification Search .......... 60/278, 60/285, 287, 291, 295, 297, 311; 701/104, 701/108
See application file for complete search history.

(56) References Cited

U.S. PATENT DOCUMENTS

| 5,319,930 | A  | * | 6/1994 | Shinzawa et al. | ............. 60/286 |
| 6,941,750 | B1 | * | 9/2005 | Boretto et al. | ................ 60/297 |
| 7,043,352 | B1 | * | 5/2006 | Miura | ........................ 701/104 |
| 7,047,729 | B1 | * | 5/2006 | van Nieuwstadt et al. | .... 60/286 |
| 7,054,734 | B1 | * | 5/2006 | Todoroki et al. | ........... 701/105 |

FOREIGN PATENT DOCUMENTS

JP    2003-172185    6/2003

* cited by examiner

*Primary Examiner*—Binh Q. Tran
(74) *Attorney, Agent, or Firm*—Nixon & Vanderhye P.C.

(57) ABSTRACT

An exhaust cleaning device of an internal combustion engine includes a particulate filter disposed in an exhaust duct of the internal combustion engine. A regeneration control increases the temperature of the particulate filter to approximately a predetermined target temperature but the amount of the temperature increase controllably corrected by the regeneration control.

10 Claims, 11 Drawing Sheets

LEARNING REGION

JUDGMENT RESULT OF LEARNING REGION

EXHAUST CLEANING DEVICE OF INTERNAL COMBUSTION ENGINE

CROSS REFERENCE TO RELATED APPLICATIONS

This application is based upon and claims the benefit of priority of Japanese Patent Application No. 2004-135249, filed on Apr. 30, 2004, the contents of which are incorporated herein by reference.

FIELD OF THE INVENTION

The present invention relates to an exhaust cleaning device of an internal combustion engine in which a particulate filter is provided in an exhaust duct and, more particularly, a device that relates to a temperature increase control process of the particulate filter.

BACKGROUND OF THE INVENTION

There is a known exhaust cleaning device which is provided with a particulate filter (hereinafter abbreviated as DPF) for collecting particulates (hereinafter abbreviated as PM) ejected from a diesel engine. In such a device, a DPF temperature is increased to, for example, 600 degrees centigrade or more when the amount of PM accumulated on the DPF reaches a predetermined value, in order to burn and remove the PM on the DPF during a DPF regeneration process.

At this time, post injection, delay in fuel injection timing, intake throttle, or the like is used as a method for increasing the DPF temperature, but any of these methods have the problem of reduction in fuel efficiency. The higher the temperature, on the other hand, the higher the burning rate of the PM becomes and, hence, the regeneration is completed in a short time. Thus, reduction in fuel efficiency in accordance with the DPF regeneration becomes low. If the DPF temperature is too high, however, the DPF temperature suddenly rises due to the sudden burn of the PM. This present a possibility of breakage of the DPF, degradation in a catalyst supported on the DPF, and the like. Accordingly, to restrain reduction in fuel efficiency and safely regenerate the DPF, it is necessary to control the temperature in such a manner as to maintain the DPF temperature at approximately a target temperature suited for the regeneration.

However, there is limitation in the ability to increase temperature of temperature increase means, and dispersion occurs in accordance with each operational state. Thus, exhaust temperature and the DPF temperature vary. To suppress these variations, it is necessary to correct the operational amount of the temperature increase means (for example, the injection quantity of the post injection), and quickly converge the DPF temperature to approximately the target temperature suited for the regeneration.

Conventional technologies include exhaust temperature feedback control in which the exhaust temperature detected by a sensor or the like is fed back and the operational amount of the temperature increase means is corrected in accordance with a deviation from the target temperature in order to maintain the DPF temperature at approximately the target temperature (see, for example, Japanese Patent Laid-Open Publication No. 2003-172185).

At this time, the exhaust temperature corresponding to the commanded operational amount has dispersion. Taking the case of using the post injection as the temperature increase means, dispersion occurs in the exhaust temperature, because actual injection quantity is different from commanded post injection quantity due to injector-to-injector variation and the like, and heat of reaction of HC is reduced due to degradation in the catalyst with a lapse of time. In the feedback control, there is a problem that the dispersion in temperature exacerbates control performance.

Accordingly, learning control with the use of the correction amount of the feedback control is considered. The feedback control is first carried out, and the dispersion in temperature is detected from the correction amount of the temperature increase means when the exhaust temperature stabilizes at approximately the target temperature. This correction amount is stored (learned) in a memory as a learning amount on an operational state basis. The amount of temperature increase operation is corrected with the learning amount corresponding to the operational state. Therefore, in the operational state which has learned once, correction corresponding to the dispersion in temperature can be carried out in advance, so that it is possible to improve the control performance.

In this method, however, there is a problem that learnable operational states are limited. When the exhaust temperature is sufficiently stable, as shown in FIG. 15, the dispersion in temperature can be detected from the correction amount (a steady state in the drawing). In a transient state, in which variation in the exhaust temperature per time is large, however, the correction amount largely varies too. Thus, it is impossible to detect the dispersion in temperature from the correction amount in the transient state and, hence, it is necessary to learn the correction amount in a state where the exhaust temperature sufficiently stabilizes with respect to the operational state and the amount of temperature increase operation. Variation in the exhaust temperature with respect to variation in the operational state and the amount of temperature increase operation is extremely sluggish (for example, 63% response takes 5 to 60 seconds). Furthermore, the operational state frequently varies in driving a vehicle. Therefore, the exhaust temperature comes in the steady state with extremely low frequency.

When the learnable operational state is limited to the steady state, as described above, it is impossible to obtain sufficient learning frequency and, hence, learning with high precision becomes difficult.

SUMMARY OF THE INVENTION

Considering the foregoing circumstances, an object of the present invention is to secure sufficient learning frequency and improve precision in learning control, in a system which carries out temperature control by feedback control of an exhaust temperature and the learning control.

To solve the foregoing problem, according to one aspect of the present invention, an exhaust cleaning device comprises a particulate filter, temperature increase means, operational state detection means, temperature detection means, particulates accumulation amount estimate means, and regeneration control means of the particulate filter. The particulate filter is disposed in an exhaust duct of an internal combustion engine. The temperature increase means increases the temperature of the particulate filter. The operational state detection means detects an operational state of the internal combustion engine. The temperature detection means detects the temperature of the particulate filter. The particulates accumulation amount estimate means estimates a particulates accumulation amount on the particulate filter. When the output of the particulates accumulation amount estimate means exceeds a predetermined value, the regeneration control means operates the temperature increase means to increase the temperature of the particulate filter to approximately a predetermined target temperature, so that accumulated particulates are burned and removed.

The exhaust cleaning device further comprises correction means for correcting an operational amount of the temperature increase means by the regeneration control means. This correction means comprises feedback correction and learning correction means. The feedback correction means corrects the operational amount of the temperature increase means with feedback, so that the output of the temperature detection means becomes approximately the predetermined target temperature. The learning correction means corrects the operational amount of the temperature increase means on the basis of the deviation between the output of temperature estimate means and the output of the temperature detection means, so that a temperature estimated value coincides with a detection value. The learning correction means also stores a correction amount as a learning correction amount. Model setting means expresses a time lag in the variation of temperature with respect to the variation of the operational amount of the temperature increase means by a transfer function. The temperature estimate means estimates an exhaust temperature on which the time lag is reflected on the basis of the output of the model setting means and the operational state detection means, and the operational amount of the temperature increase means.

Accordingly, in a system for carrying out temperature control by feedback control of the exhaust temperature and learning control, the time lag in the variation of temperature with respect to the operational state and the amount of temperature increase operation is modeled by the transfer function. The temperature estimated value, on which the effect of the time lag is reflected, is calculated on the basis of the transfer function, and the calculated estimated value is compared with a measured temperature in order to detect dispersion in temperature during a transient state. Accordingly, it is possible to secure sufficient learning frequency and improve precision in the learning control. Therefore, the temperature of the particulate filter is kept at approximately the target temperature, so that it is possible to restrain reduction in fuel efficiency due to regeneration.

In an exhaust cleaning device according to another aspect of the present invention, the feedback correction means calculates the feedback correction amount by carrying out, for example, state feedback which uses a set model of the model setting means. Using the state feedback makes high response control possible. Otherwise, the feedback correction amount may be calculated in accordance with the deviation between the output of the temperature detection means and the predetermined target temperature.

In an exhaust cleaning device according to yet another aspect of the present invention, the learning correction means calculates the learning correction amount on the basis of the integrated amount of the deviation between the temperature estimated value and the measured value. To be more specific, the integrated amount of the deviation is calculated to detect the dispersion in temperature. Since the correction amount is increased with increase in the integrated amount, it is possible to carry out the learning control with high precision.

In an exhaust cleaning device according to yet another aspect of the present invention, the learning correction means stores the learning correction amount on an operational state basis. Since the dispersion in temperature differs according to the operational state, storing learning values on separate memories on an operational state basis makes it possible to realize the effective learning control.

In an exhaust cleaning device according to still another aspect of the present invention, the model setting means models the time lag as the transfer function expressed by a dead time and a time constant, or the transfer function expressed by a higher-order lag. The model setting means switches the dead time, the time constant, or a coefficient of the higher-order lag in accordance with the output of the operational state detection means.

The time lag in the variation of temperature with respect to the variation of the amount of temperature increase operation can be expressed by the transfer function using the dead time and the time constant. Accordingly, it is possible to improve control precision by modeling a control target on an operational state basis with the use of the transfer function, and carrying out learning correction with the time lag reflected.

In an exhaust cleaning device according to still another aspect of the present invention, the temperature estimate means calculates a temperature in a steady state on the basis of the output of the operational state detection means and the operational amount of the temperature increase means, and filters the temperature with the transfer function set by the model setting means in order to calculate the estimated value.

To be more specific, a temperature to which the exhaust temperature converges is first calculated with respect to the amount of temperature increase operation, and then the temperature is filtered by use of the transfer function of the set model. Thus, it is possible to estimate the temperature on which the time lag is reflected, and detect the dispersion in temperature during transient change.

An exhaust cleaning device according to still another aspect of the present invention further comprises learning execution judgment means. The learning execution judgment means judges whether or not to update the learning correction amount calculated by the learning correction means, on the basis of the output of the temperature detection means or the temperature estimate means.

If there is an error in modeling, the error may cause wrong learning. This error becomes large with increase in the variation of temperature per time. Thus, if the execution of learning is judged on the basis of the rate of change of the exhaust temperature with time, it is possible to prevent the wrong learning due to the error in the estimated value while keeping the learning frequency.

In an exhaust cleaning device according to still yet another aspect of the present invention, the learning execution judgment means updates the learning correction amount, when a rate of change (absolute value) of the temperature detection means or the temperature estimate means is lower than a predetermined value. The learning execution judgment means stops the update thereof, when the rate of change is equal to or higher than the predetermined value.

To be more specific, a value serving as a criterion is set, and learning is carried out only when the rate of change with time is lower than this predetermined value. Therefore, it is possible to prevent the wrong learning.

An exhaust cleaning device according to still yet another aspect of the present invention further comprises learning prohibition means. The learning prohibition means prohibits the update of the learning correction amount, when the learning correction amount (absolute value) calculated by the learning correction means is higher than a predetermined value.

When the learning correction amount is high, it is conceivable that the exhaust temperature does not temporarily increase because a catalyst is not activated or the like. Accordingly, comparing the learning correction amount with the predetermined value, the update of the learning correction amount is prohibited to prevent the wrong learning.

An exhaust cleaning device according to still yet another aspect of the present invention further comprises temperature increase prohibition means. The temperature increase prohibition means prohibits the operation of the temperature increase means, when the learning correction amount (absolute value) calculated by the learning correction means is higher than a predetermined value.

When the learning correction amount is quite high, there is the possibility of a malfunction in an injector, the catalyst, or the like. Thus, stopping regeneration control makes it possible to protect the catalyst and the particulate filter. The predetermined value in the device according to the tenth aspect is set higher than the predetermined value in the device according to the ninth aspect.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
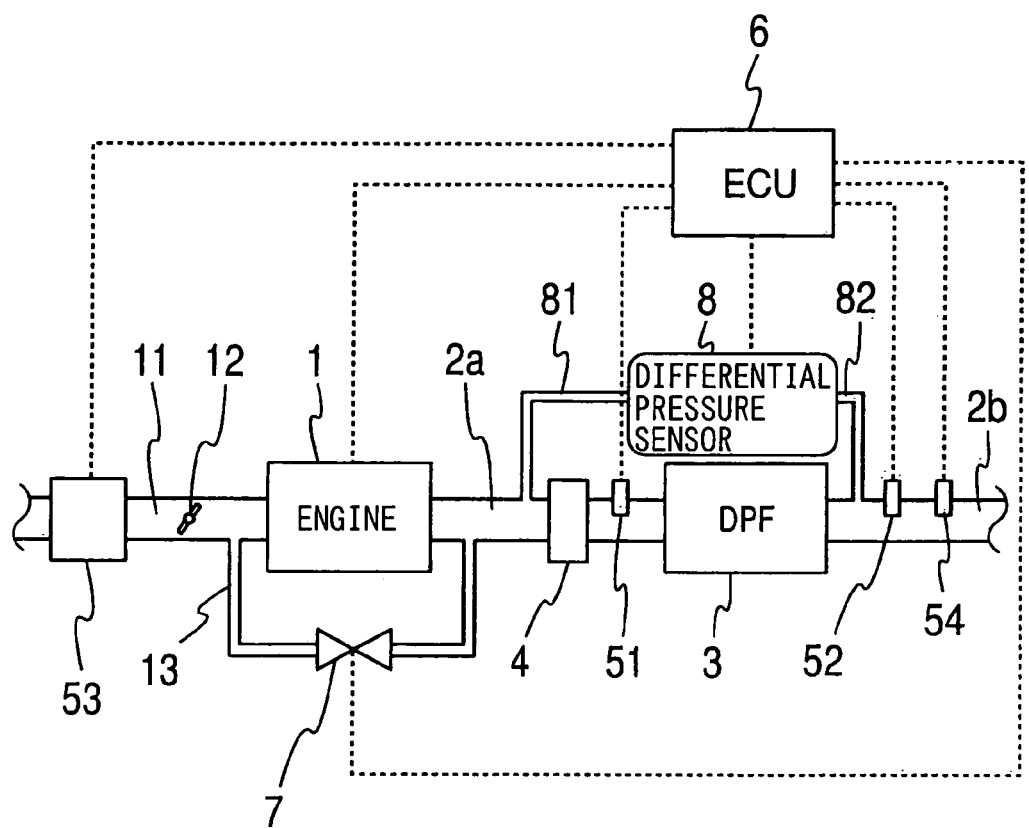
FIG. 1 is a schematic view of an exhaust cleaning device of an internal combustion engine according to the present invention.

A first embodiment of an exhaust cleaning device of a diesel engine to which the present invention is applied will be hereinafter described. FIG. 1 shows an example of the structure of a system. An oxidation catalyst (DOC) 4 is disposed upstream of a diesel particulate filter (DPF) 3. The DPF 3 is disposed between exhaust ducts 2a and 2b of a diesel engine 1, and the DOC 4 is disposed in the exhaust duct 2a a upstream of the DPF 3. The DPF 3 is a ceramic filter with well-known structure. In the DPF 3, for example, heat-resistant ceramic such as cordierite is molded into honeycomb structure, and many cells being gas passages are sealed in such a manner that inlets or outlets are alternate with one another. While exhaust ejected from the engine 1 flows downstream through porous partition walls of the DPF 3, particulates (PM) are collected and gradually accumulated.

In the DOC 4 with a well-known structure, the oxidation catalyst is supported on the surface of a ceramic carrier which has cordierite honeycomb structure or the like. The DOC 4 burns hydrocarbons (HC) supplied to the exhaust duct 2a a by catalytic reaction to increase an exhaust temperature, and increases the temperature of the DPF 3. The DPF 3 may be a metal filter, and the oxidation catalyst may be or may not be supported thereon. By using the DPF 3 on which the oxidation catalyst is supported, the DOC 4 may not be disposed upstream thereof.

To detect the temperature of the DPF 3, an upstream exhaust temperature sensor 51 is disposed between the DOC 4 and the DPF 3 in the upstream exhaust duct 2a. A downstream exhaust temperature sensor 52 is disposed in the exhaust duct 2b downstream of the DPF 3. These exhaust temperature sensors 51 and 52 (temperature detection means) are connected to an ECU 6. The exhaust temperature sensors 51 and 52 detect the temperatures of the exhaust flowing into the DPF 3 and ejected from the DPF 3, and output the temperatures to the ECU 6.

An air flow meter 53 is disposed in an intake pipe 11 of the engine 1 to output the amount of intake air to the ECU 6. An intake throttle valve 12 is disposed in the intake pipe 11 downstream of the air flow meter 53 to increase or decrease the amount of intake air by a command from the ECU 6. The intake throttle valve 12 varies the passage area of the disposed intake pipe 11 by varying the degree of opening of the valve, to control the amount of intake air. An A/F sensor (air-fuel ratio sensor) 54 is disposed in the exhaust duct 2b downstream of the DPF 3. Otherwise, an $O_2$ sensor may be disposed in the exhaust duct 2b instead of the A/F sensor 54, or these sensors may be combined.

The intake pipe 11 of the engine 1 is connected to the exhaust duct 2a upstream of the DOC 4 through an EGR passage 13 provided with an EGR control valve 7. The EGR control valve 7 increases or decreases the amount of the exhaust (EGR amount) refluxed into intake air by a command from the ECU 6. The EGR control valve 7 having a well-known structure is composed of an electronic vacuum regulator valve (EVRV) and a mechanical exhaust gas regulator valve (EGRV). The EGR control valve 7 regulates the amount of vacuum by a vacuum pump in accordance with control current outputted from the ECU 6, and generates control negative pressure in a vacuum chamber to control the amount of valve lift of the exhaust gas regulator valve.

A differential pressure sensor 8 for detecting pressure difference between the front and back of the DPF 3 is connected in the exhaust ducts 2a and 2b to obtain the amount of particulates (PM accumulation amount) collected by the DPF 3. One end of the differential pressure sensor 8 is connected to the exhaust duct 2a upstream of the DPF 3, and the other end is connected to the exhaust duct 2b downstream of the DPF 3 through pressure introducing tubes 81 and 82, respectively. The differential pressure sensor 8 outputs a signal corresponding to the pressure difference between the front and back of the DPF 3 to the ECU 6.

Not-illustrated various sensors such as an accelerator opening sensor and an engine speed sensor are further connected to the ECU 6. The ECU 6 detects the operational state of the engine 1 (operational state detection means) on the basis of detection signals from the various sensors, and calculates the optimum amount of fuel injection, fuel injection timing, fuel injection pressure, and the like, in order to control fuel injection to the engine 1, the degree of opening of the intake throttle valve 12 and the EGR control valve 7, and the like. The ECU 6 also carries out post injection and the like on the basis of output from the foregoing various sensors, and increases the temperature of the DPF 3 to the combustion temperature of the PM or more in order to regenerate the DPF 3.

The regeneration of the DPF 3 will be hereinafter described. The ECU 6 has temperature increase means, particulates accumulation amount estimate means, regeneration control means, and correction means. The temperature increase means increases the exhaust temperature, and increases the HC in the exhaust to rise the temperature of the DPF 3 by the heat of reaction of the HC in the DOC 4. The particulates accumulation amount estimate means estimates the amount of PM accumulation on the DPF 3. The regeneration control means increases the temperature of the DPF 3 to approximately a predetermined target temperature by controlling the temperature increase means to burn and remove the accumulated PM, when the PM accumulation amount exceeds a predetermined value. The correction means corrects the operational amount of the temperature increase means.

The particulates accumulation amount estimate means estimates the PM accumulation amount from, for example, the pressure difference between the front and back of the DPF 3 detected by the differential pressure sensor 8. When the amount of an exhaust flow is constant, the pressure difference between the front and back of the DPF is increased with increase in the PM accumulation amount. Thus, researching this relation in advance makes it possible to obtain the PM accumulation amount. Otherwise, the amounts of PM ejection may be calculated on the basis of the conditions of engine operation known by output from the various sensors, and the PM accumulation amount may be estimated by adding them up. These methods may be combined.

To be more specific, post injection, fuel addition from a fuel additive device (not illustrate) disposed in the exhaust duct 2a upstream of the DOC 4 into the exhaust, delay in fuel injection timing (retard), intake throttle by the intake throttle valve 12, the increase of EGR by the EGR control valve 7, or the like is available as the temperature increase means. Otherwise, an intercooler bypass may be provided in an engine with an intercooler for aspiration. According to these operations, the unborn HC supplied to the exhaust duct 2 generates heat in the DOC 4 by oxidation reaction, or the temperature of the exhaust ejected from the engine 1 is increased, so that the exhaust with high temperature is supplied to the DPF 3. As the temperature increase means, one of these operations may be carried out, or a plurality of these operations may be combined.

A temperature (target temperature) necessary for the regeneration of the DPF 3 is a constant predetermined value which is set as high as possible in consideration of safety (for example, 600 degrees centigrade). Otherwise, the target temperature may be changeable in accordance with the amount of remaining particulates during increase in temperature. In this case, it is preferable that the less the amount of remaining particulates (PM accumulation amount), the higher the value of the target temperature be set. For example, when the amount of particulates exceeds a predetermined value 1 (for example, 4 g/L), the target temperature is set at 600 degrees centigrade to prevent the fast combustion of the particulates. When the amount of particulates is the predetermined value 1 (for example, 4 g/L) or less, the target temperature is set at 650 degrees centigrade to prevent reduction in fuel efficiency due to the regeneration. Otherwise, the target temperature may be changed in a multistage manner.

Figure 2:
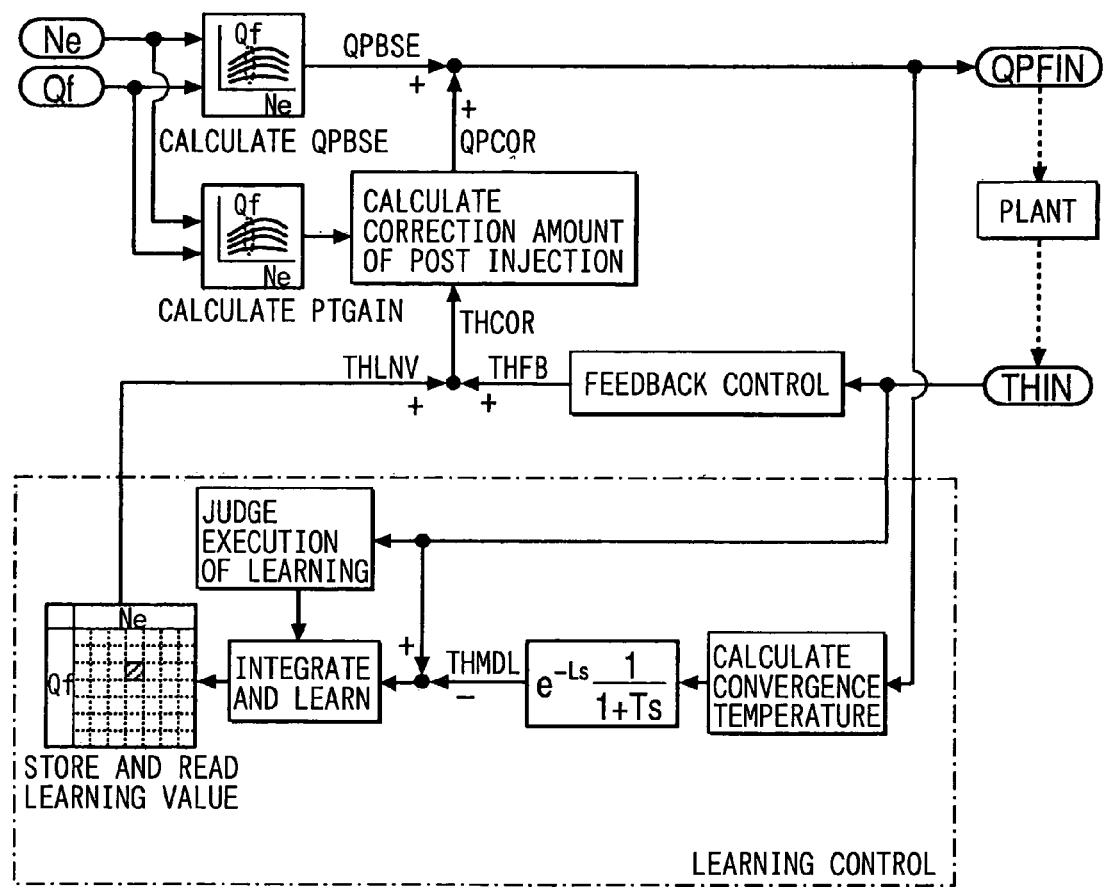
FIG. 2 is a block diagram of a DPF temperature control process according to the present invention.

By way of example, in the structure shown in FIG. 1 in which the DOC 4 is disposed upstream of the DPF 3, a method for controlling the DPF temperature in which the post injection is carried out as the temperature increase means will be described in detail. In this embodiment, the temperature of the exhaust between the DOC 4 and the DPF 3 detected by the upstream exhaust temperature sensor 51 is controlled. FIG. 2 is a block diagram showing an overview of DPF temperature control according to this embodiment. Regeneration control means calculates the basic amount of post injection QPBSE from an engine speed Ne and required injection quantity Qf in accordance with the present operational state. Then, the regeneration control means adds the correction amount of post injection QPCOR by the correction means to the basic amount of post injection QPBSE, to calculate the final amount of post injection QPFIN. The basic amount of post injection QPBSE is regulated in advance so that the exhaust temperature converges to approximately the target temperature.

The correction means carries out state feedback on the output of the upstream exhaust temperature sensor 51 (upstream exhaust temperature THIN) to calculate the feedback correction amount THFB of the post injection (feedback correction means). The correction means also carries out learning correction on the basis of the upstream exhaust temperature THIN to calculate a learning correction amount THLNV (learning correction means). The upstream exhaust temperature THIN is the output of the upstream exhaust temperature sensor 51 disposed between the DOC 4 and the DPF 3.

The learning correction means first calculates a temperature (convergence temperature THCNV) to which the upstream exhaust temperature THIN converges, when the present operational state and the present amount of temperature increase operation are maintained. The convergence temperature is studied in advance. A time lag in the variation of the exhaust temperature with respect to the variation of the amount of post injection is modeled by use of a transfer function (model setting means), and an estimated value THMDL of the exhaust temperature on which the time lag is reflected is calculated (temperature estimation means).

Figure 3:
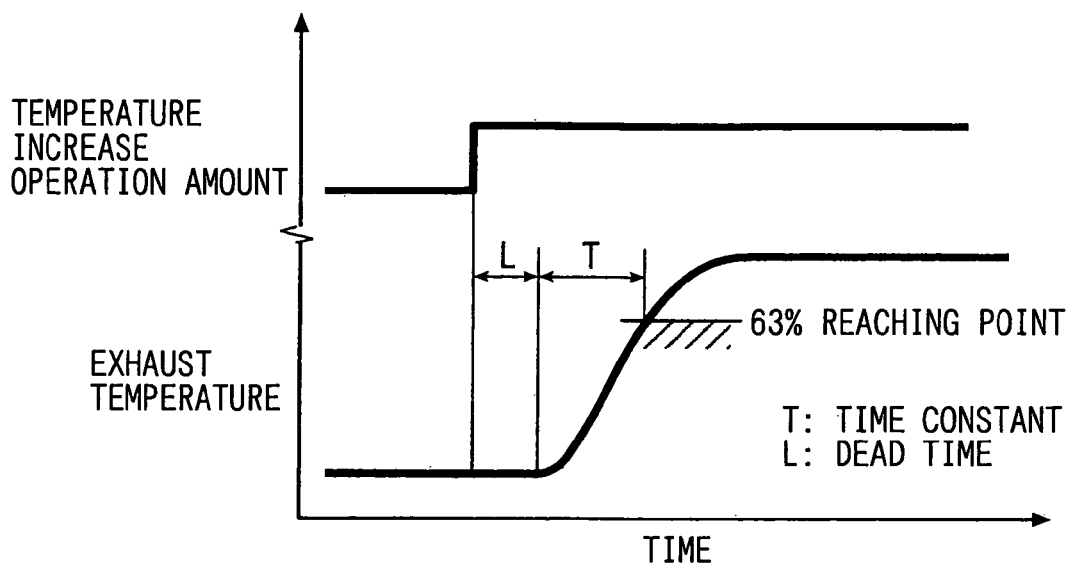
FIG. 3 is a graph illustrating a time lag in a variation of an exhaust temperature with respect to an amount of temperature increase operation expressed by a time constant and a dead time.

As shown in FIG. 3, the time lag in the variation of the exhaust temperature with respect to the variation of the operational state and amount of temperature increase operation is modeled by use of the transfer function described below, which is expressed by a time constant (first-order lag) and a dead time.

$$e^{-Ls}\frac{1}{1+Ts}(T: \text{ time constant, } L: \text{ dead time})$$

Figure 4:
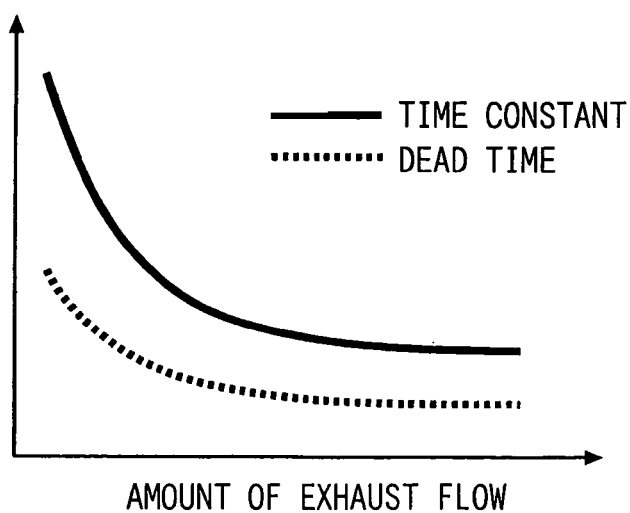
FIG. 4 is a graph illustrating a variance in the time constant and the dead time relative to an amount of an exhaust flow.

At this time, since the time constant and the dead time vary with the amount of the exhaust flow as shown in FIG. 4, switching the time constant and the dead time in accordance with the amount of the exhaust flow (the amount of intake air) makes it possible to increase precision in learning. For example, the time constant and the dead time are reduced with increase in the amount of intake air, and the time constant and the dead time are increased with reduction in the amount of intake air. A time lag model may be expressed by a higher-order lag. A control model may be switched on the basis of the engine speed and the injection quantity, instead of the amount of intake air. Expressing a transfer function as a higher-order lag makes it possible to express a lag with high precision. Thus, there is an advantage that more precise control becomes possible, though the adjustment of a model and arithmetic processing becomes complicated.

Filtering the calculated convergence temperature THCNV by use of this transfer function makes it possible to calculate the estimated value THMDL on which the time lag is reflected. When there is certain dispersion in temperature, the exhaust temperature is estimated by the estimated value THMDL. The dispersion in temperature is detected by comparing this estimated value with a measured value, and the detected dispersion in temperature is stored in a memory as a learning amount. To be more specific, integral learning is carried out on the basis of deviation between the estimated value THMDL and the upstream exhaust temperature THIN, to calculate the learning correction amount THLNV. The correction amount of post injection QPFB is calculated from the learning correction amount THLNV, the feedback correction amount THFB, and sensitivity PTGAIN to variation in temperature corresponding to the present engine speed Ne and required injection quantity Qf.

Figure 5:
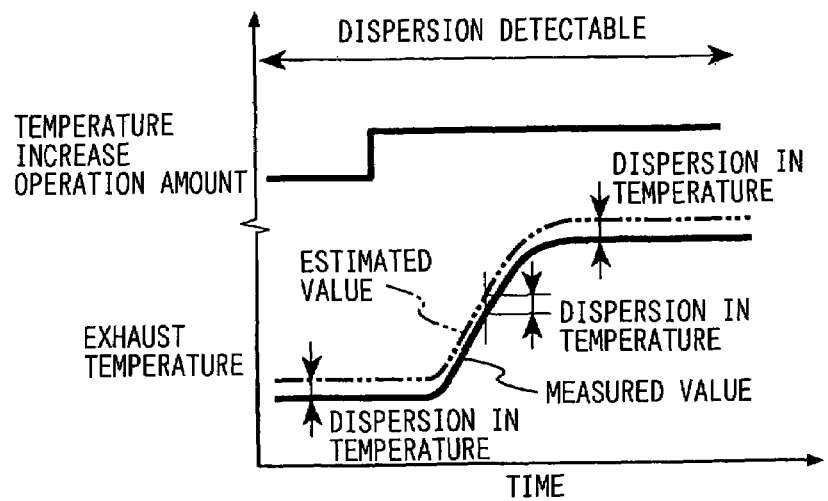
FIG. 5 is a graph illustrating an estimated value of temperature reflecting the time lag relative to a measured value of temperature.
Figure 6:
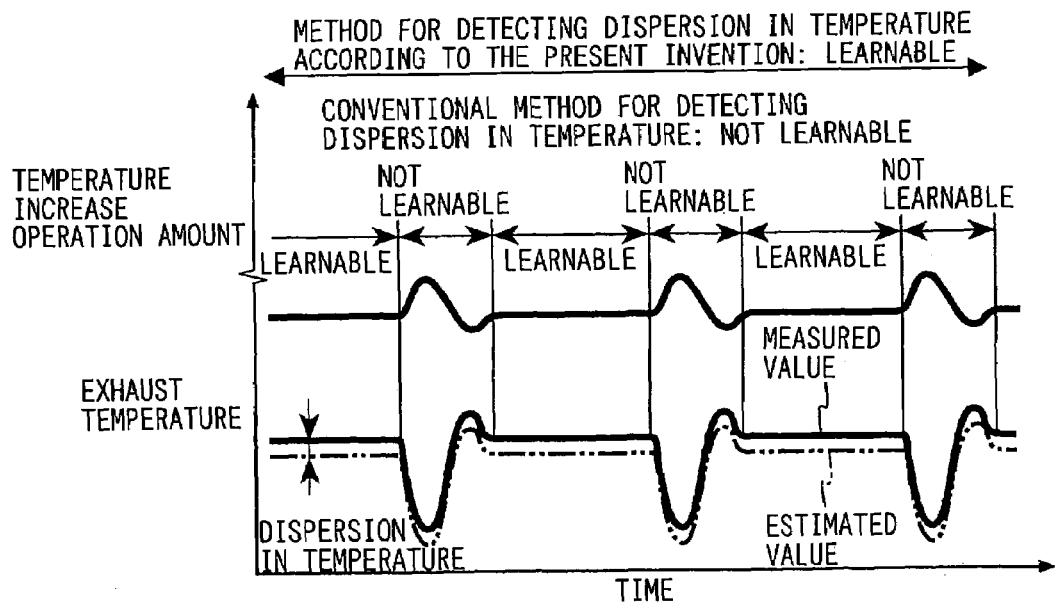
FIG. 6 is a graph illustrating an increase in a detection frequency of dispersion in temperature due to the estimated value of the temperature reflecting the time lag.

According to the present invention, as described above, since the estimated value of temperature on which the time lag is considered is compared with the measured value, it is possible to detect the dispersion in temperature even if temperature transiently varies by the variation of the operational state, as shown in FIG. 5. Namely, as shown in FIG. 6, the dispersion in temperature during transient change could not be detected by a method on which the time lag is not reflected such as conventional learning control. As compared with it, a learning control method according to the present invention can detect the dispersion in temperature even during the transient change, so that it is possible to extremely increase detection frequency.

Figure 7:
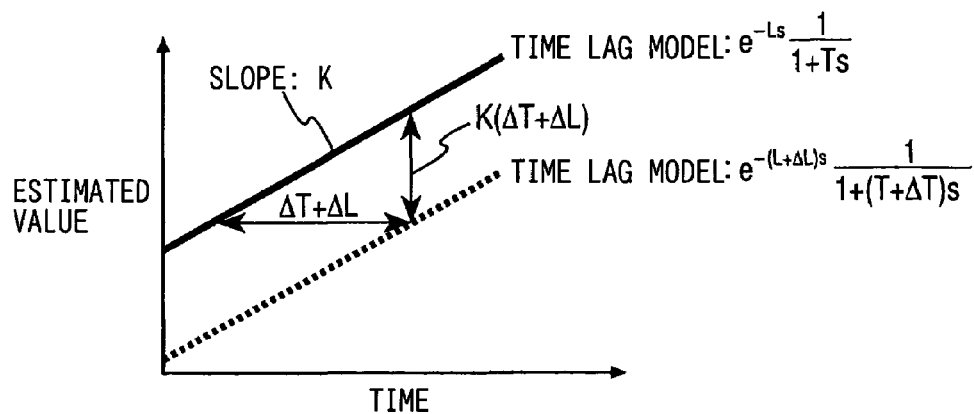
FIG. 7 is a graph illustrating a temperature deviation due to a modeling error of the time lag increase relative to a rate of change of the exhaust temperature over time.

At the time of modeling the time lag, if there is a modeling error, wrong learning may be carried out due to the error. Considering the modeling error in detail, there is no modeling error in a steady state, but the modeling error is increased with increase in the variation of temperature per time. Thus, the dispersion in temperature largely affects detection. When the transfer function $e^{-Ls}(1/(1+Ts))$ expressed by the dead time L and the time constant T expresses the time lag model, and a model has errors of $\Delta T$ and $\Delta L$ with respect to true values T and L as shown in FIG. 7, for example, the deviation in temperature due to the modeling error becomes $K(\Delta T+\Delta L)$ (K: the rate of change of temperature with time). Accordingly, it is apparent that the higher the rate K of change of temperature with time, the larger the deviation in temperature due to the modeling error becomes.

Accordingly, to reduce the effect of the modeling error, performing or stopping an update of the learning correction amount is judged on the basis of the rate of change of temperature with time (learning execution judgment means). When a required learning precision A is determined, the rate K of change of temperature with time satisfying this precision can be calculated from $A=K(\Delta T+\Delta L)$. Thus, when the required learning precision A is higher than a predetermined value 3 (the rate of change of temperature with time for stopping learning), the update of the learning correction amount THLNV is stopped, and hence it is possible to prevent the wrong learning because of the modeling error and improve the learning precision.

Figure 8A:
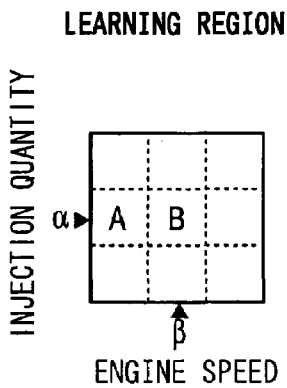
FIGS. 8A and 8B are graphs illustrating that an incorrect learning can be reduced by reflecting the time lag in the variation of temperature based on a learning region judgment.
Figure 8B:
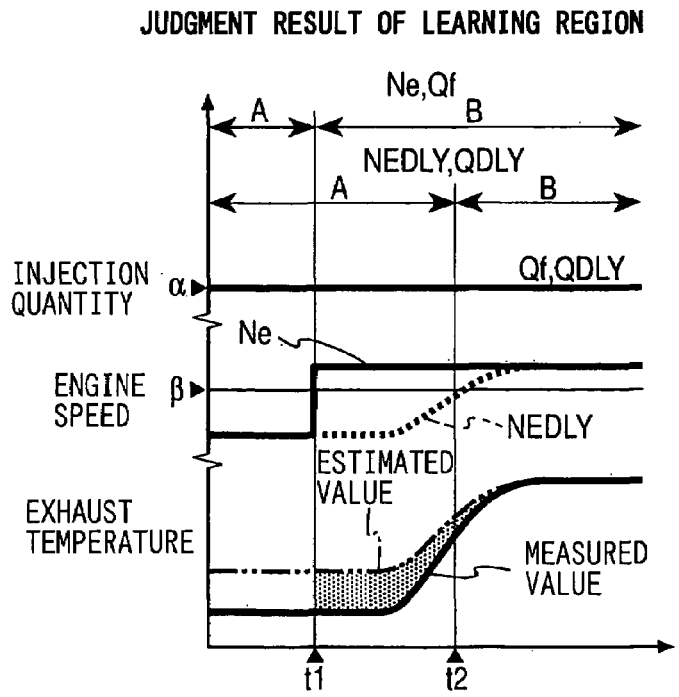

The dispersion in temperature differs from operational state to operational state, so that learning values (the learning correction amounts) are stored on an operational region basis. The learning values are stored in, for example, a two-dimensional array on the memory. The axes of the memory are the engine speed and the required injection quantity. At this time, it should be noted that the detected dispersion in temperature has to be stored as a learning amount in an operational state in which the dispersion in temperature occurs. In other words, the variation of temperature has a time lag with respect to the variation of the operational state, so that present dispersion in temperature occurs by the effect of a past operational state by the time lag. Now, it is considered that the learning value is stored in which of learning regions divided as shown in FIG. 8A when, for example, the engine speed Ne suddenly changes as shown in FIG. 8B (time t1 in the drawing). At this time, since a learning region is judged on the basis of the present engine speed Ne and the present fuel injection quantity Qf, time of t1 or later corresponds to a region B in FIG. 8A. However, since the deviation between the measured value and the estimated value after the time t1 (a hatched section in FIG. 8B) is caused by dispersion in a region A, storing the dispersion on the region B causes wrong learning and reduction in learning precision.

To prevent the wrong learning, signals NEDLY and QDLY, in which the engine speed Ne and the fuel injection quantity Qf are filtered by the transfer function expressing the time lag, are used as signals for the judgment of the region of the learning value. Accordingly, a judgment result of the region B becomes time t2 or later, and hence the wrong learning can be reduced. When the absolute value of the foregoing learning correction amount THLNV is higher than a predetermined value 4 (learning prohibition amount), the update of the learning correction amount THLNV is stopped (learning prohibition judgment means). This is because it is considered that the exhaust temperature does not briefly increase due to the insufficient activation of the catalyst and the like. The update of the learning correction amount is not carried out to prevent the wrong learning.

When the absolute value of the foregoing learning correction amount THLNV is higher than a predetermined value 5 (temperature increase prohibition amount), increase in temperature is stopped (temperature increase prohibition judgment means). This is cancellation of increase in temperature to protect the catalyst and the DPF, when a malfunction such as abnormal injection of post injection due to the breakdown of an injector, degradation of the catalyst, and the breakdown of the exhaust temperature sensor is conceivable. The predetermined value 5 for stopping increase in temperature is set higher than the predetermined value 4 for stopping the update of the learning correction amount (temperature increase prohibition amount>learning prohibition amount).

Figure 9:
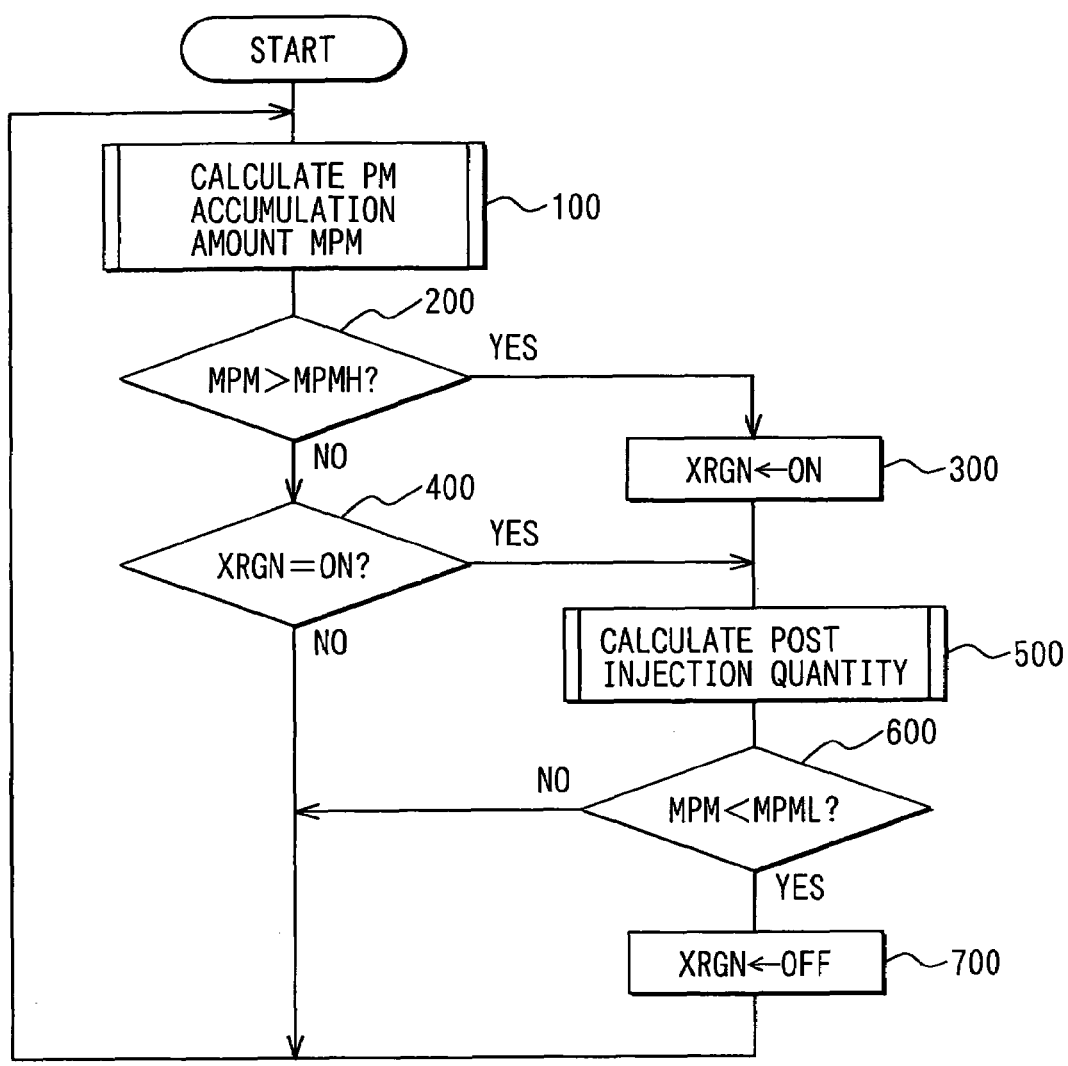
FIG. 9 is a flowchart of a basic operation of a DPF regeneration process performed by an ECU according to a first embodiment of the present invention.

FIGS. 9 to 14 are flowcharts showing the operation of the ECU 6 according to this embodiment. The detailed operation will be hereinafter described. FIG. 9 is the flowchart of the basic operation in regenerating the DPF 3. A PM accumulation amount MPM of the DPF 3 is first detected in step 100. For example, the relation between the amount of the exhaust flow and the pressure difference between the front and back of the DPF depends on the PM accumulation amount. By use of this relation, the PM accumulation amount is calculated on the basis of the pressure difference detected by the differential pressure sensor 8 to which pressure upstream and downstream of the DPF 3 is introduced, and the amount of the exhaust flow passing through the DPF 3. Estimating the PM ejected from the engine in each operational condition, the PM accumulation amount may be calculated by adding them up.

In step 200, the PM accumulation amount MPM calculated in step 100 is compared with a PM accumulation amount MPMH for starting regeneration (predetermined value 1: for example, 4 g/L). When the PM accumulation amount MPM exceeds the PM accumulation amount MPMH for starting regeneration, the regeneration of the DPF 3 is judged to be necessary, and the operation advances to step 300. A DPF regeneration flag XRGN is turned on in step 300, and the operation advances to step 500 to control increase in the temperature of the DPF 3. When the PM accumulation amount MPM is equal to or lower than the PM accumulation amount MPMH for starting regeneration in step 200, the operation advances to step 400 to judge whether or not the DPF regeneration flag XRGN is turned on. If the DPF regeneration flag XRGN is turned on, it is judged that the DPF 3 is in the course of regeneration. Thus, the operation advances to step 500 to control increase in the temperature of the DPF 3. If the XRGN is turned off, the temperature of the DPF 3 is not increased.

In step 500, a post injection quantity which is necessary for increasing the temperature of the DPF 3 to a regenerable temperature is calculated. The detailed operation thereof will be hereinafter described with reference to FIG. 10. In step 510, the basic amount of post injection QPBSE corresponding to the present operational state is calculated. To be more specific, the present engine speed Ne and the fuel injection quantity Qf are read, and the basic amount of post injection QPBSE is calculated by using a map of the basic amount of post injection QPBSE, which is prepared in advance.

A target temperature THTRG is calculated in step 520. It is preferable that the target temperature THTRG be set as high as possible within the DPF temperature at which the PM quickly burns. The DPF temperature for causing the fast combustion of the PM varies in accordance with the PM accumulation amount, so that the target temperature THTRG may be changed in accordance with the PM accumulation amount MPM. When the PM accumulation amount MPM exceeds the predetermined value 1 (for example, 4 g/L), for example, the target temperature is set lower (for example, 600 degrees centigrade) than a target temperature (for example, 650 degrees centigrade) which is equal to or lower than the predetermined value 1.

In step 530, a DPF upstream exhaust temperature THIN read from the output of the upstream exhaust temperature sensor 51 is fed back, to calculate a feedback correction amount THFB of post injection. This embodiment uses state feedback, in which the deviation between the upstream exhaust temperature THIN and the target temperature THTRG and a correction amount in the past are used as state quantity, so that it is possible to carry out control with high response. The feedback correction amount THFB may be calculated by well-known PID control based on the deviation between the upstream exhaust temperature THIN and the target temperature THTRG or the like.

In step 550, a present exhaust temperature estimated value THMDL is calculated on the basis of the histories of the operational state and the amounts of post injection ejected in the past. This will be described with reference to FIG. 11A. In step 551, the present amount of intake air GA is read from the output of the air flow meter 53 disposed in the intake pipe 11. Then, a time constant T and a dead time L of a time lag model are calculated on the basis of the amount of intake air GA in steps 552 and 553. The time constant T and the dead time L are read from one-dimensional maps of the amount of intake air GA (refer to FIGS. 11B and 11C) prepared in advance. Then, in step 554, a temperature THCNV to which the exhaust temperature converges is calculated from the present operational condition and the amount of post injection.

Figure 12:
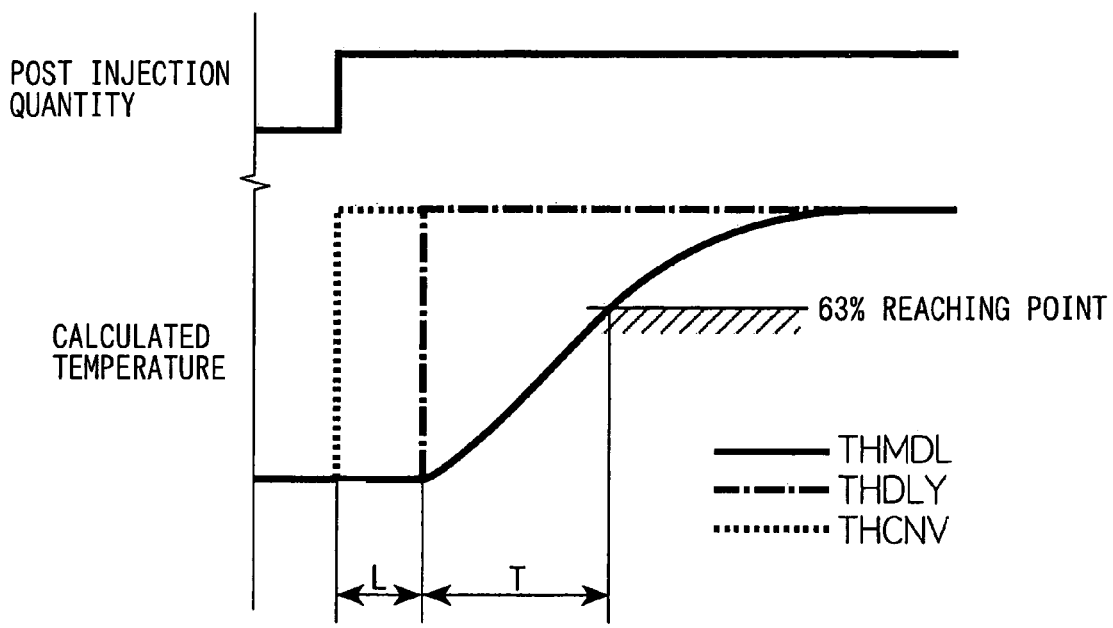
FIG. 12 is a graph of a method for calculating the estimated value of temperature reflecting the time lag relative to a convergence temperature and a lagging signal.
Figure 15:
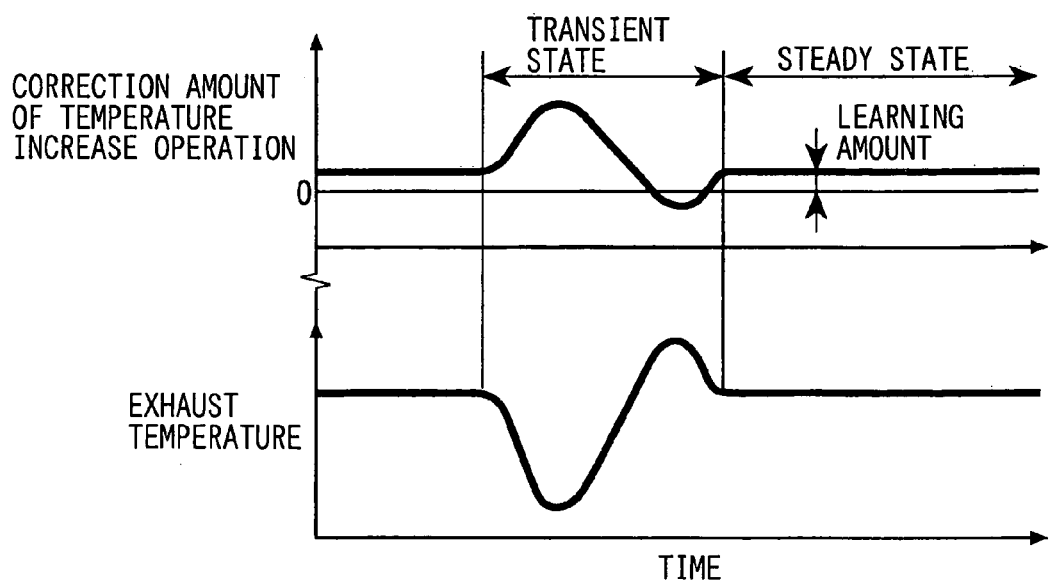
FIG. 15 is a graph illustrating a conventional learning control process.
Figure 13A:
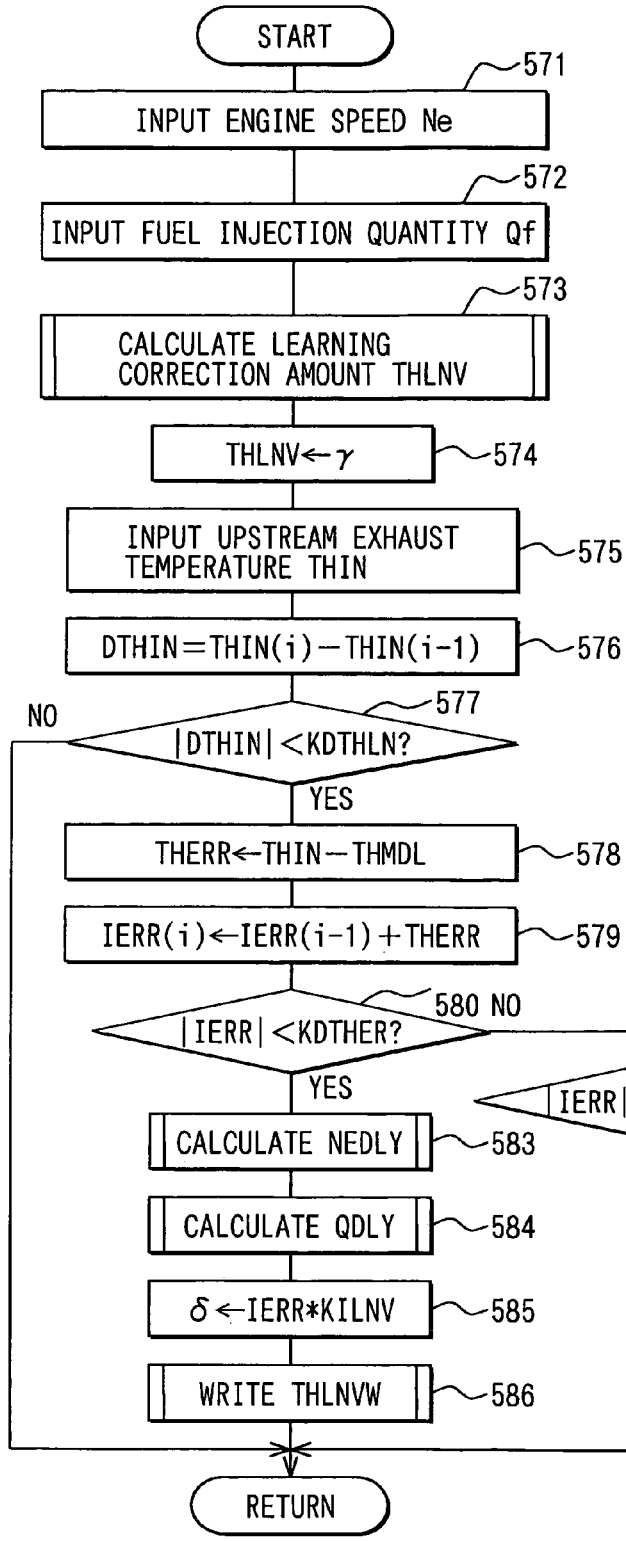
FIG. 13A is a flowchart of a process for calculating a learning correction amount.
Figure 13B:
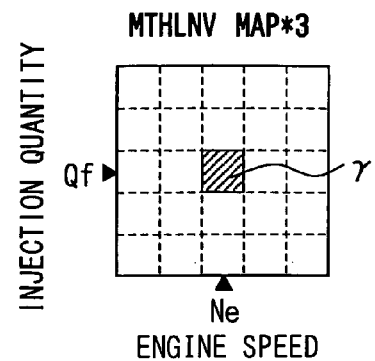
FIGS. 13B and 13C are graphs of learning correction amount maps.
Figure 13C:
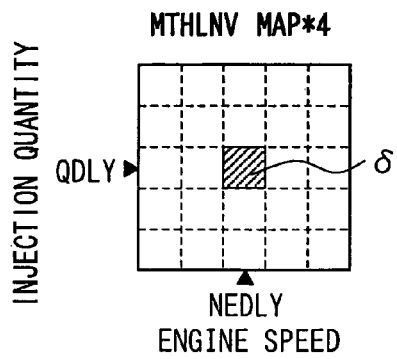
Figure 14A:
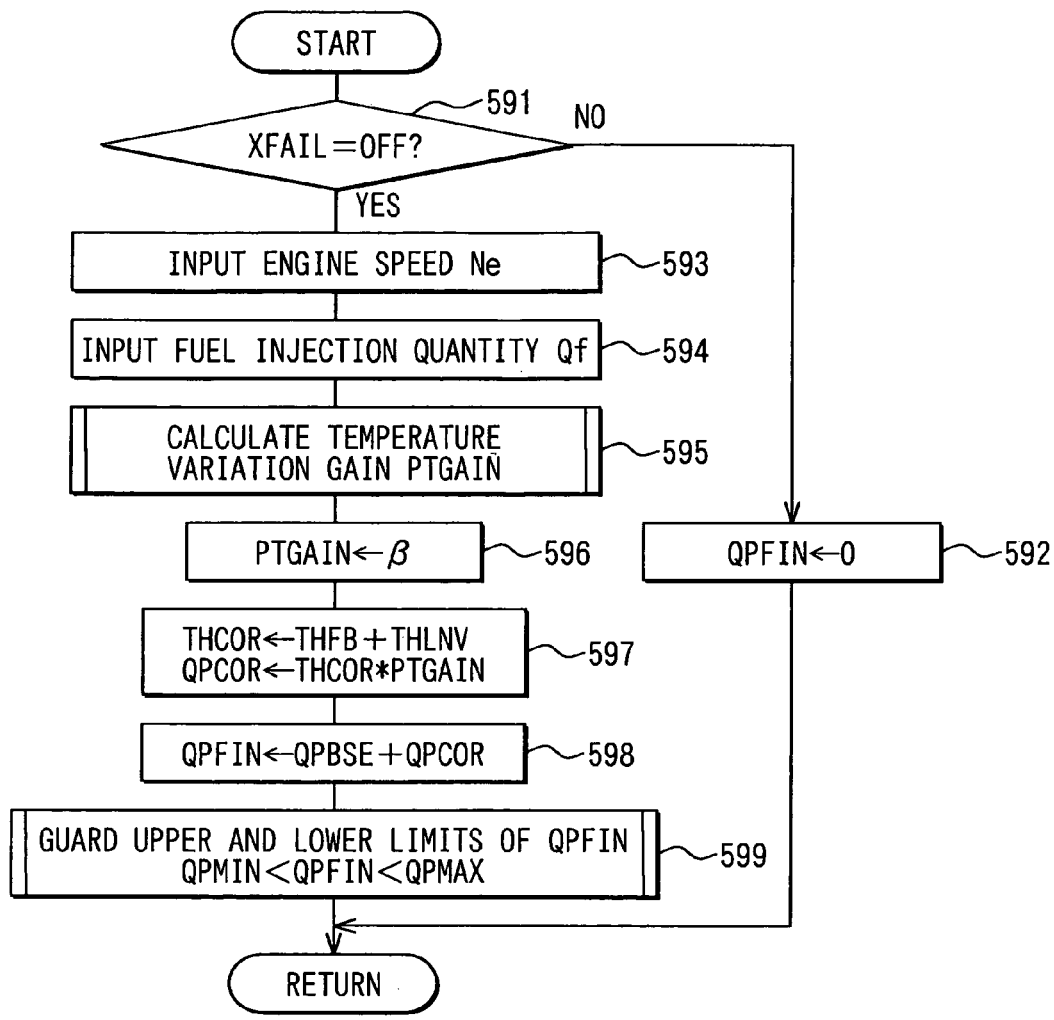
FIG. 14A is a flowchart of a process for calculating the final amount of the post injection.
Figure 14B:
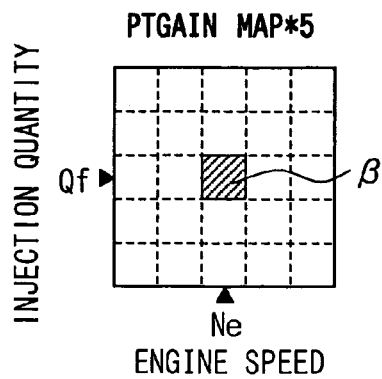
FIG. 14B is a graph of a temperature variation gain map.

A signal THDLY, in which the convergence temperature THCNV is delayed by the dead time L, is calculated in steps 555 to 559. FIG. 12 shows the relation between the convergence temperature THCNV and the lagging signal THDLY with respect to the variation of the amount of post injection. At this time, when the dead time L quickly changes because of the change of the operational state, a value of the convergence temperature THCNV(i−d) read in step 559 becomes discontinuous from a previous calculation in terms of time, and causes reduction in precision. To prevent it, a value NL, in which the dead time L is divided by an operation period dt and a result is rounded to an integer, is read in step 555. Then, the present value NL(i) is compared with a previous value NL(i−1) in step 556. When NL(i)<NL (i−1) holds, the operation advances to step 558. Otherwise, namely, when the dead time quickly changes in the direction of increase, NL(i) is gradually changed in step 557.

In step 560, the lagging signal THDLY is subjected to filtering of a one-dimensional lag in accordance with the time constant T by use of the following expression, and the exhaust temperature estimated value THMDL is calculated.

$$THMDL(i) \leftarrow THDLY(i)*dt/T + THMDL(i-1)*(1-dt/T)$$

FIG. 12 shows the relation between the lagging signal THDLY and the exhaust temperature estimated value THMDL.

Figure 10:
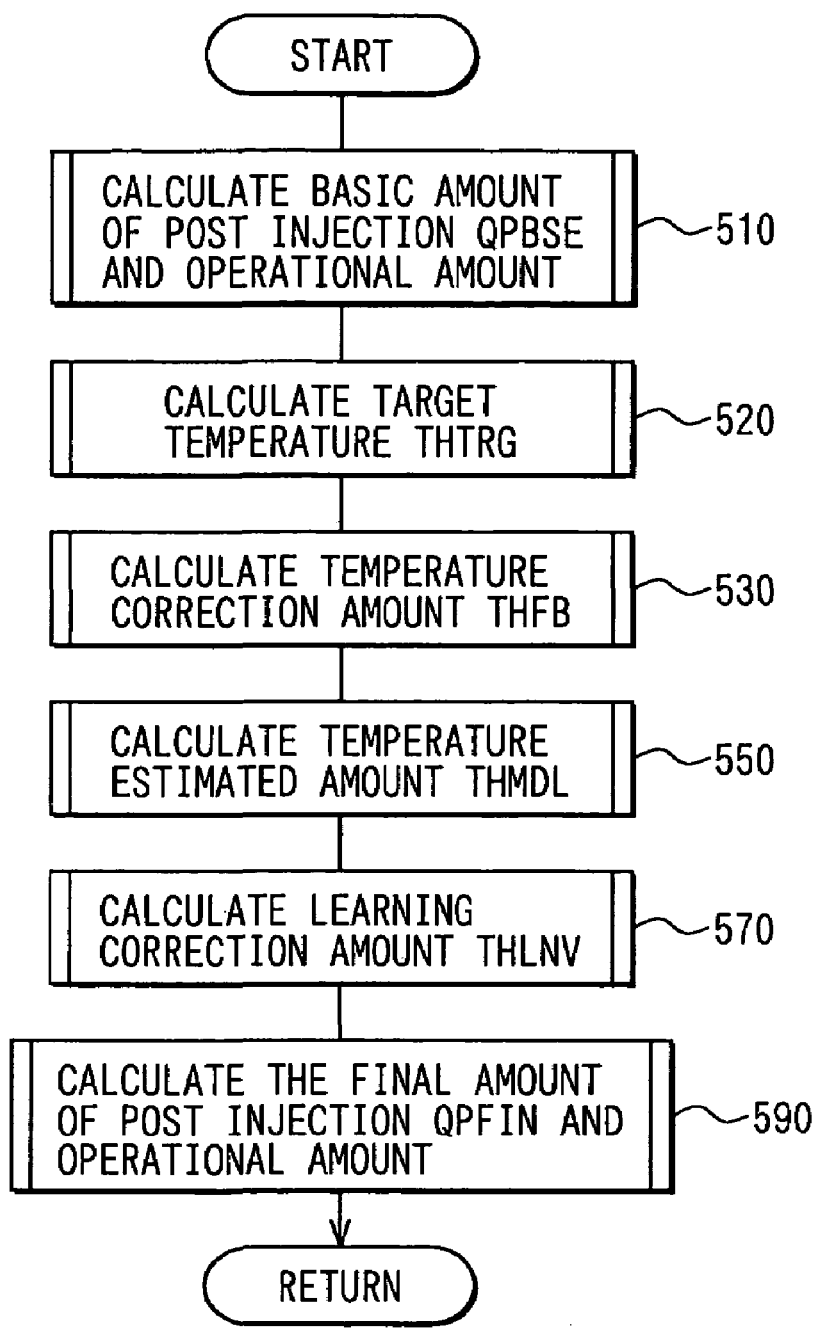
FIG. 10 is a flowchart of a process for calculating a final amount of a post injection.
Figures 11A, 11B, 11C:
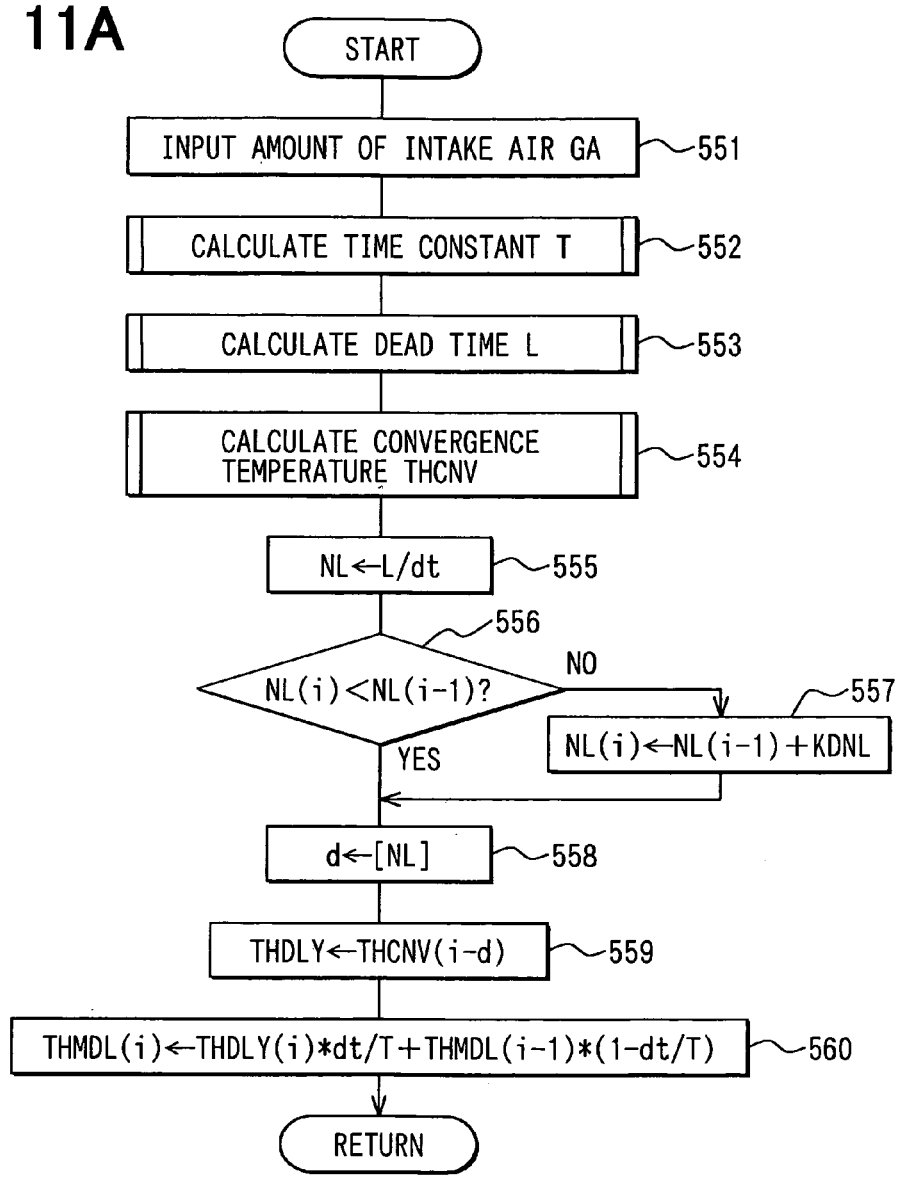
FIG. 11A is a flowchart of a process for calculating the estimated value of temperature reflecting the time lag.
FIG. 11B is a graph of a time constant map.
FIG. 11C is a graph of dead time map.

In step 570 of FIG. 10, a correction amount is calculated from an integrated value of dispersion in temperature with respect to the variation of the operational state, and is stored as a learning correction amount THLNV. This will be described with reference to FIG. 13A. The present engine speed Ne is first read in step 571, and then the fuel injection quantity Qf is read in step 572. Then, in steps 573 and 574, a learning value γ, which corresponds to the present engine speed Ne and the fuel injection quantity Qf, is read as the learning correction amount THLNV on the basis of a two-dimensional array MTHLNV of learning values (refer to FIG. 13B), on which the learning correction amounts of each operational region are stored. The axes of the two-dimensional array MTHLNV are the engine speed and the injection quantity.

An upstream exhaust temperature THIN is read from the upstream exhaust temperature sensor 51 disposed in the exhaust duct 2a upstream of the DPF 3 in step 575. A difference DTHIN between the upstream exhaust temperature THIN and a previously read upstream exhaust temperature is calculated in step 576. In step 577, the absolute value of the difference DTHIN calculated in step 576 is compared with the rate of change of a learning stop temperature with time KDTHLN (predetermined value 3: for example, 3 degrees centigrade/sec). When the absolute value of the difference DTHIN is lower than the rate of change of the learning stop temperature with time KDTHLN, the operation advances to step 578 to update the learning correction amount THLNV. When the absolute value of the difference DTHIN is equal to or more than the rate of change of the learning stop temperature with time KDTHLN, the learning correction amount THLNV is not updated to prevent wrong learning due to a model error, and this routine is ended.

In step 578, the deviation THERR between the upstream exhaust temperature THIN read in step 575 and the temperature estimated value THMDL calculated in step 550 is calculated. Then, the integrated value IERR of the deviation THERR is calculated by the following expression in step 579.

$$IERR(i) \leftarrow IERR(i-1)+THERR$$

The absolute value of the integrated value IERR is compared with a learning prohibition integrated amount KDTHER (predetermined value 4) in step 580. If the absolute value of the integrated value IERR is lower than the learning prohibition integrated amount KDTHER, the operation advances to step 583 to update the learning correction amount. If the absolute value of the integrated value IERR is equal to or higher than the learning prohibition integrated amount KDTHER, the operation advances to step 581.

In step 581, the absolute value of the integrated value IERR is compared with a temperature increase prohibition integrated amount KDTHFAIL (predetermined value 5). If the absolute value of the integrated value IERR is lower than the temperature increase prohibition integrated amount KDTHFAIL, this routine is ended without updating the learning correction amount. If the absolute value of the integrated value IERR is equal to or larger than the temperature increase prohibition integrated amount KFTHFAIL, the operation advances to step 582. In step 582, a temperature increase control abnormal flag XFAIL is turned on, and the post injection is stopped. The DPF regeneration flag XRGN is turned off, and the regeneration is stopped.

In step 583, the present engine speed Ne and the fuel injection quantity Qf are filtered in accordance with the time constant T and the dead time L calculated in steps 552 and 553, to calculate signals NEDLY and QDLY with a time lag. In step 585, an integrated learning value δ is calculated by multiplying the integrated value IERR by a learning value gain KILNV. Then, the integrated learning value δ is written into a MTHLNV map shown in FIG. 13C as the learning correction amount THLNV corresponding to the lagging signals NEDLY and QDLY.

In step 590 of FIG. 10, the correction amount of the temperature increase means, which corresponds to the feedback correction amount THFB and the learning correction amount THLNV, is calculated in order to calculate the final amount of post injection QPFIN. This will be described with reference to FIG. 14A. First, if the temperature increase control abnormal flag XFAIL is turned off in step 591, the operation advances to step 593 to correct the amount of post injection. If the temperature increase control abnormal flag XFAIL is turned on, the operation advances to step 592 to stop post injection.

In steps 593 to 596, sensitivity PTGAIN to the amount of variation of temperature with respect to the variation of the amount of post injection in accordance with an operational state is calculated. To be more specific, the present engine speed Ne and the fuel injection quantity Qf are read in steps 593 and 594. In steps 595 and 596, a value β corresponding to the engine speed Ne and the fuel injection quantity Qf is obtained from a temperature variation gain PTGAIN map shown in FIG. 14B, and the temperature variation gain PTGAIN is calculated from the value β.

In step 597, the learning correction amount THLNV calculated in step 570 is added to the feedback correction amount THFB calculated in step 530 to calculate a temperature correction amount THCOR. Then, the temperature correction amount THCOR is multiplied by the temperature variation gain PTGAIN to calculate the correction amount of post injection QPCOR. This is because of converting the temperature correction amount THCOR calculated in the order of temperature (for example, degrees centigrade) into the order of the amount of post injection being the amount of temperature increase operation (for example, mm$^3$/st). Adjusting the order by use of the temperature variation gain PTGAIN (for example, (mm$^3$/st)/degrees centigrade) makes final correction possible.

In step 598, the correction amount of post injection QPCOR is added to the basic amount of post injection QPBSE to calculate the final amount of post injection QPFIN. In step 599, the upper and lower limits of the final amount of post injection QPFIN are guarded by the following expression.

$$QPMIN<QPFIN<QPMAX$$

In step 600 of FIG. 9, the PM accumulation amount MPM calculated in step 100 is compared with a PM accumulation amount MPML for ending the regeneration (predetermined value 2: for example, 0.5 g/L). If the PM accumulation amount MPM is equal to or lower than the PM accumulation amount MPML for ending the regeneration, the end of the regeneration is judged, and the operation advances to step 700. The DPF regeneration flag XRGN is turned off, and the regeneration is ended in step 700.

The effects of the method for controlling the exhaust temperature between the DOC 4 and the DPF 3 was described above, in the structure of disposing the DOC 4 upstream of the DPF 3. Similar effects can be obtained, if the DOC 4 is not provided, and the DPF temperature estimated by the operational state, the amount of temperature increase operation, the exhaust temperature, and the like is controlled with feedback.

According to the present invention, in DPF temperature control during regeneration, when the amount of temperature increase operation is corrected by feeding back an exhaust temperature, a time lag in the variation of temperature with respect to operational conditions and the amount of temperature increase operation is modeled by a transfer function. The deviation between an estimated value of the exhaust temperature based on a model and a measured value is stored as a learning amount on an operational state basis, in order to reflect the deviation on a correction amount. Since the execution of learning is judged on the basis of the rate of change of the exhaust temperature with time, it is possible to prevent wrong learning due to an error in the estimated value, with maintaining learning frequency. Therefore, it is possible to improve control precision, and restrain reduction in fuel efficiency caused by the regeneration.

What is claimed is:

1. An exhaust cleaning device of an internal combustion engine comprising:

a particulate filter disposed in an exhaust duct of the internal combustion engine;

temperature increase means for increasing the temperature of the particulate filter;

operational state detection means for detecting an operational state of the internal combustion engine;

temperature detection means for detecting the temperature of the particulate filter;

particulates accumulation amount estimate means for estimating a particulates accumulation amount on the particulate filter;

regeneration control means for operating the temperature increase means to increase the temperature of the particulate filter to approximately a predetermined target temperature, so that accumulated particulates are burned and removed when the output of the particulates accumulation amount estimate means exceeds a predetermined value; and correction means for correcting an operational amount of the temperature increase means by the regeneration control means, the correction means comprising:

feedback correction means for correcting the operational amount of the temperature increase means with feedback, so that the output of the temperature detection means becomes approximately the predetermined target temperature;

model setting means for expressing a time lag in the variation of temperature with respect to the variation of the operational amount of the temperature increase means by a transfer function;

temperature estimate means for estimating a temperature on which the time lag is reflected on the basis of the output of the operational state detection means, the operational amount of the temperature increase means, and the transfer function set by the model setting means; and learning correction means for correcting the operational amount of the temperature increase means on the basis of the deviation between the output of the temperature estimate means and the output of the temperature detection means, so that a temperature estimated value coincides with a detection value, and for storing a correction amount as a learning correction amount.

2. An exhaust cleaning device of an internal combustion engine according to claim 1, wherein the feedback correction means calculates the feedback correction amount by carrying out state feedback which uses a set model of the model setting means or in accordance with the deviation between the output of the temperature detection means and the predetermined target temperature.

3. An exhaust cleaning device of an internal combustion engine according to claim 1, wherein the learning correction means increases the correction amount with increase in an integrated amount of the deviation.

4. An exhaust cleaning device of an internal combustion engine according to claim 1, wherein the learning correction means stores the learning correction amount on an operational state basis.

5. An exhaust cleaning device of an internal combustion engine according to claim 1, wherein the model setting means models the time lag as the transfer function expressed by a dead time and a time constant, or the transfer function expressed by a higher-order lag, and switches the dead time, the time constant, or a coefficient of the higher-order lag in accordance with the output of the operational state detection means.

6. An exhaust cleaning device of an internal combustion engine according to claim 1, wherein the temperature estimate means calculates a temperature in a steady state on the basis of the output of the operational state detection means and the operational amount of the temperature increase means, and filters the temperature with the transfer function set by the model setting means in order to calculate the estimated value.

7. An exhaust cleaning device of an internal combustion engine according to claim 1, further comprising:

learning execution judgment means for judging whether or not to update the learning correction amount calculated by the learning correction means, on the basis of the output of the temperature detection means or the output of the temperature estimate means.

8. An exhaust cleaning device of an internal combustion engine according to claim 7, wherein the learning execution judgment means updates the learning correction amount, when a rate of change (absolute value) of the temperature detection means or the temperature estimate means is lower than a predetermined value, and stops the update thereof, when the rate of change is equal to or higher than the predetermined value.

9. An exhaust cleaning device of an internal combustion engine according to claim 1, further comprising:

learning prohibition means for prohibiting the update of the learning correction amount, when the learning correction amount (absolute value) calculated by the learning correction means is higher than a predetermined value.

10. An exhaust cleaning device of an internal combustion engine according to claim 1, further comprising:

temperature increase prohibition means for prohibiting the operation of the temperature increase means, when the learning correction amount (absolute value) calculated by the learning correction means is higher than a predetermined value.

* * * * *